United States Patent
Chen et al.

(10) Patent No.: US 11,531,183 B2
(45) Date of Patent: Dec. 20, 2022

(54) OPTICAL ASSEMBLY HAVING SUPPORT PORTION AND FIXING PORTION FOR SMA LINE, CAMERA MODULE HAVING OPTICAL ASSEMBLY, AND SMART DEVICE HAVING CAMERA MODULE

(71) Applicant: NINGBO SUNNY OPOTECH CO., LTD., Zhejiang (CN)

(72) Inventors: Zhenyu Chen, Ningbo (CN); Hongde Tu, Ningbo (CN); Yinli Fang, Ningbo (CN); Hui Qiu, Ningbo (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 289 days.

(21) Appl. No.: 16/765,005

(22) PCT Filed: Oct. 16, 2018

(86) PCT No.: PCT/CN2018/110474
§ 371 (c)(1),
(2) Date: May 18, 2020

(87) PCT Pub. No.: WO2019/109734
PCT Pub. Date: Jun. 13, 2019

(65) Prior Publication Data
US 2020/0310081 A1   Oct. 1, 2020

(30) Foreign Application Priority Data

Dec. 8, 2017  (CN) .......................... 201711299057.6
Dec. 8, 2017  (CN) .......................... 201721700067.1

(51) Int. Cl.
*G02B 7/09* (2021.01)
*G03B 13/36* (2021.01)
*H04N 5/225* (2006.01)

(52) U.S. Cl.
CPC ............... *G02B 7/09* (2013.01); *G03B 13/36* (2013.01); *H04N 5/2254* (2013.01); *G03B 2205/0076* (2013.01)

(58) Field of Classification Search
CPC .......... G02B 7/09; G02B 7/028; G02B 7/023; G02B 7/08; G02B 7/04; G03B 13/36;
(Continued)

(56) References Cited

U.S. PATENT DOCUMENTS 6,928,812 B2 * 8/2005 Donakowski ........... F03G 7/065
                                                           60/527
7,451,595 B2   11/2008 Komori et al.
(Continued)

FOREIGN PATENT DOCUMENTS

CN    102770804 A    11/2012
CN    208156392 U    11/2018
(Continued)

OTHER PUBLICATIONS

Extended European Search Report for European Application No. 18887029.9, dated Dec. 14, 2020.

*Primary Examiner* — Padma Haliyur
(74) *Attorney, Agent, or Firm* — Birch, Stewart, Kolasch & Birch, LLP

(57) ABSTRACT

An optical assembly, a camera module having the optical assembly, and a smart device having the camera module. The optical assembly comprises: a lens module (10) having an outer frame (12), wherein the outer frame (12) comprises four side surfaces divided according to an angle range, the lens module (10) comprises a first support portion (13) and a second support portion (14) on each side surface of the outer frame (12), and both the first support portion (13) and the second support portion (14) on each side surface are located at a group of diagonal regions (12A) of the outer frame (12); and a fixing means (30) disposed at another
(Continued)

group of diagonal regions (12B) of the outer frame (12) of the lens module (10), wherein the fixing means (30) has a first power supply fixing portion (311) and a first groundwire fixing portion (321) corresponding to the first support portion (13), and a second power supply fixing portion (331) and a second groundwire fixing portion (322) corresponding to the second support portion (14), on a respective fixing surface corresponding to each side surface of the outer frame (12).

19 Claims, 8 Drawing Sheets

(58) Field of Classification Search
CPC .... G03B 2205/0076; G03B 2205/0015; G03B 3/10; G03B 17/12; G03B 5/00; G03B 2205/0007; H04N 5/2254; F03G 7/06
See application file for complete search history.

(56) References Cited

U.S. PATENT DOCUMENTS

| | | | |
|---|---|---|---|
| 2009/0052037 A1* | 2/2009 | Wernersson | H04N 5/23287 359/554 |
| 2011/0249131 A1* | 10/2011 | Topliss | G02B 27/646 348/208.7 |
| 2013/0002933 A1 | 1/2013 | Topliss et al. | |
| 2015/0365568 A1* | 12/2015 | Topliss | H04N 5/2251 348/360 |
| 2017/0289455 A1 | 10/2017 | Hu et al. | |
| 2018/0172946 A1* | 6/2018 | Fuse | G02B 27/646 |

FOREIGN PATENT DOCUMENTS

| | | | | |
|---|---|---|---|---|
| JP | 2013-246301 A | 12/2013 | | |
| WO | WO 2014/091399 A2 | 6/2014 | | |
| WO | WO 2016/189314 A1 | 12/2016 | | |
| WO | WO-2016194346 A1 * | 12/2016 | ........... | G02B 27/646 |
| WO | WO 2017/133456 A1 | 8/2017 | | |

* cited by examiner

OPTICAL ASSEMBLY HAVING SUPPORT PORTION AND FIXING PORTION FOR SMA LINE, CAMERA MODULE HAVING OPTICAL ASSEMBLY, AND SMART DEVICE HAVING CAMERA MODULE

CROSS-REFERENCE TO RELATED APPLICATIONS

The present application claims the priority of Chinese Patent Applications Nos. 201711299057.6 and 201721700067.1, filed with the State Intellectual Property Office of China on Dec. 8, 2017, the entire content of which is incorporated herein by reference.

TECHNICAL FIELD

The present application relates to an optical assembly, a camera module having the optical assembly, and a smart device having the camera module.

BACKGROUND

All of the camera modules on the existing smart devices basically use motor mechanisms to drive the lenses to move longitudinally, thereby achieving auto-focus. However, the motor carrier driving the lens to perform longitudinal movement requires a certain movement stroke. Therefore, it is necessary to reserve a space for the longitudinal movement of the lens in the smart device. Taking a smart phone as an example, as the smart phone becomes thinner and thinner, the available space that can be left for the camera module in the smart phone becomes smaller and smaller. Moreover, the motor carrier needs a certain thrust generated by a magnet driving a coil to drive the lens to achieve longitudinal movement, wherein the magnet occupies a large volume inside the motor, and in order to make the thrust reach a certain value, it is difficult to reduce the volume of the magnet. Therefore, it is necessary to improve the motor structure and reduce the motor's volume without reducing the magnet volume, so that the volume of the camera module of the smart phone is reduced.

A shape memory alloy (SMA) line can eliminate the deformation generated at a lower temperature after the temperature is raised, and restore its original shape before the deformation. Thus, the SMA line can be used to replace the motor to drive the lens for movement. Compared with the conventional motor, the SMA line has a smaller volume, which can effectively reduce the overall size of the module. It is advantageous for the miniaturization of the module.

SUMMARY

The present application aims to propose a camera module and a smart device having the camera module, which are expected to have a smaller volume and can realize auto-focus and optical image stabilization under the drive of an SMA line.

According to an aspect of the present application, there is provided an optical assembly, comprising: a lens module having an outer frame, wherein the outer frame comprises four side surfaces divided according to an angle range, the lens module comprises a first support portion and a second support portion on each side surface of the outer frame, and both the first support portion and the second support portion on each side surface are located at a group of diagonal regions of the outer frame; and a fixing means disposed at another group of diagonal regions of the outer frame of the lens module, wherein the fixing means has a first power supply fixing portion and a first groundwire fixing portion corresponding to the first support portion, and a second power supply fixing portion and a second groundwire fixing portion corresponding to the second support portion, on a respective fixing surface corresponding to each side surface of the outer frame.

In one implementation, the optical assembly further comprises a base disposed below the lens module, for supporting the lens module and fixing the fixing means.

In one implementation, the first support portion and the second support portion are integrally formed on the outer frame of the lens module.

In one implementation, the positions of the first support portion, the second support portion, the first power supply fixing portion, the first groundwire fixing portion, the second power supply fixing portion and the second groundwire fixing portion are disposed so that: a first group of connecting lines including a first connecting line and a second connecting line are formed between a first support position on the first support portion and a fixing position on the first power supply fixing portion and between a second support position on the first support portion and a fixing position on the first groundwire fixing portion, a second group of connecting lines including a third connecting line and a fourth connecting line are formed between a third support position on the second support portion and a fixing position on the second power supply fixing portion and between a fourth support position on the second support portion and a fixing position on the second groundwire fixing portion, wherein the first group of connecting lines and the second group of connecting lines intersect but do not contact each other.

In one implementation, the positions of the first support portion, the second support portion, the first power supply fixing portion, the first groundwire fixing portion, the second power supply fixing portion and the second groundwire fixing portion are disposed so that: the first connecting line and the second connecting line are parallel to each other, and the third connecting line and the fourth connecting line are parallel to each other.

In one implementation, on each side surface of the outer frame, distances between the first support position and the second support position on one hand and a corresponding side surface of the outer frame on the other hand are different from those between the third support position and the fourth support position on one hand and a corresponding side surface of the outer frame on the other hand.

In one implementation, on each fixing surface of the fixing means, distances between a fixing position on the first power supply fixing portion and a fixing position on the first groundwire fixing portion on one hand and the fixing surface on the other hand are different from those between a fixing position on the second power supply fixing portion and a fixing position on the second groundwire fixing portion on one hand and the fixing surface on the other hand.

In one implementation, at least the first support portion among the first support portion and the second support portion is a winding portion, and a winding structure of the winding portion is disposed at a position corresponding to the first support position and the second support position.

In one implementation, the winding portion has a winding structure parallel to an optical axis.

In one implementation, the winding portion has a winding structure perpendicular to an optical axis.

In one implementation, the first support portion and the second support portion are both winding portions, and are formed by two parts on the same shaft member parallel to an optical axis, and the shaft member is disposed in a support member extending outwardly from a corresponding side surface of the outer frame.

In one implementation, the winding portion has a T-shaped or I-shaped winding structure.

In one implementation, at least the first support portion among the first support portion and the second support portion is a movable end fixing portion.

In one implementation, the movable end fixing portion includes a first movable end fixing position and a second movable end fixing position, and the first movable end fixing position and the second movable end fixing position correspond to the first support position and the second support position, respectively.

In one implementation, the movable end fixing portion further comprises a conductive element (namely an electrically conductive element) inside, and the conductive element is disposed between the first movable end fixing position and the second movable end fixing position.

In one implementation, the fixing means comprises: a first power supply fixing end and a first groundwire fixing end, wherein the first power supply fixing portion and the first groundwire fixing portion are disposed on the first power supply fixing end and the first groundwire fixing end, respectively; and/or a second power supply fixing end and a second groundwire fixing end, wherein the second power supply fixing portion and the second groundwire fixing portion are disposed on the second power supply fixing end and the second groundwire fixing end, respectively.

In one implementation, the first power supply fixing end and the second power supply fixing end are different power supply fixing ends.

In one implementation, the first groundwire fixing end and the second groundwire fixing end are the same groundwire fixing end.

In one implementation, the first groundwire fixing end and the second groundwire fixing end are different groundwire fixing ends.

In one implementation, the same groundwire fixing end is located between the first power supply fixing end and the second power supply fixing end.

In one implementation, the fixing means comprises: a first fixing member, wherein the first power supply fixing portion and the first groundwire fixing portion are fixed in the first fixing member in a manner of being electrically insulated from each other, and/or a second fixing member, wherein the second power supply fixing portion and the second groundwire fixing portion are fixed in the second fixing member in a manner of being electrically insulated from each other.

In one implementation, the first support portion, the second support portion, the first power supply fixing portion, the first groundwire fixing portion, the second power supply fixing portion and the second groundwire fixing portion corresponding to each side surface of the outer frame, and the first support portion, the second support portion, the first power supply fixing portion, the first groundwire fixing portion, the second power supply fixing portion and the second groundwire fixing portion corresponding to an adjacent side surface, are disposed symmetrically.

In one implementation, distances between the first support portion on each side surface of the outer frame on one hand and the first power supply fixing portion and the first groundwire fixing portion on a corresponding fixing surface of the fixing means on the other hand are the same as those between the second support portion on each side surface of the outer frame on one hand and the second power supply fixing portion and the second groundwire fixing portion on a corresponding fixing surface of the fixing means on the other hand.

In one implementation, distances between the first support portion on each side surface of the outer frame on one hand and the first power supply fixing portion and the first groundwire fixing portion on a corresponding fixing surface of the fixing means on the other hand are different from those between the second support portion on each side surface of the outer frame on one hand and the second power supply fixing portion and the second groundwire fixing portion on a corresponding fixing surface of the fixing means on the other hand.

According to another aspect of the present application, there is provided a camera module, comprising the optical assembly in any one of the implementations described above.

In one implementation, the camera module further comprises an SMA line disposed around the outer frame of the camera module, for driving the camera module to move in a plurality of directions.

In one implementation, on each side surface of the outer frame, the SMA line comprises a first SMA line and a second SMA line, movable ends of the first SMA line and the second SMA line are supported by the first support portion and the second support portion, respectively, two fixed ends of the first SMA line are fixed to the first power supply fixing portion and the first groundwire fixing portion, respectively, and two fixed ends of the second SMA line are fixed to the second power supply fixing portion and the second groundwire fixing portion, respectively.

According to still another aspect of the present application, there is provided a smart device, comprising the camera module in any one of the implementations described above.

The optical assembly, the camera module and the smart device provided according to the present application have a relatively small volume, and can easily realize auto-focus and optical image stabilization.

BRIEF DESCRIPTION OF THE DRAWINGS

Exemplary embodiments are shown in the reference drawings. The embodiments and accompanying drawings disclosed herein are to be considered illustrative and not restrictive.

DETAILED DESCRIPTION

Figure 1A:
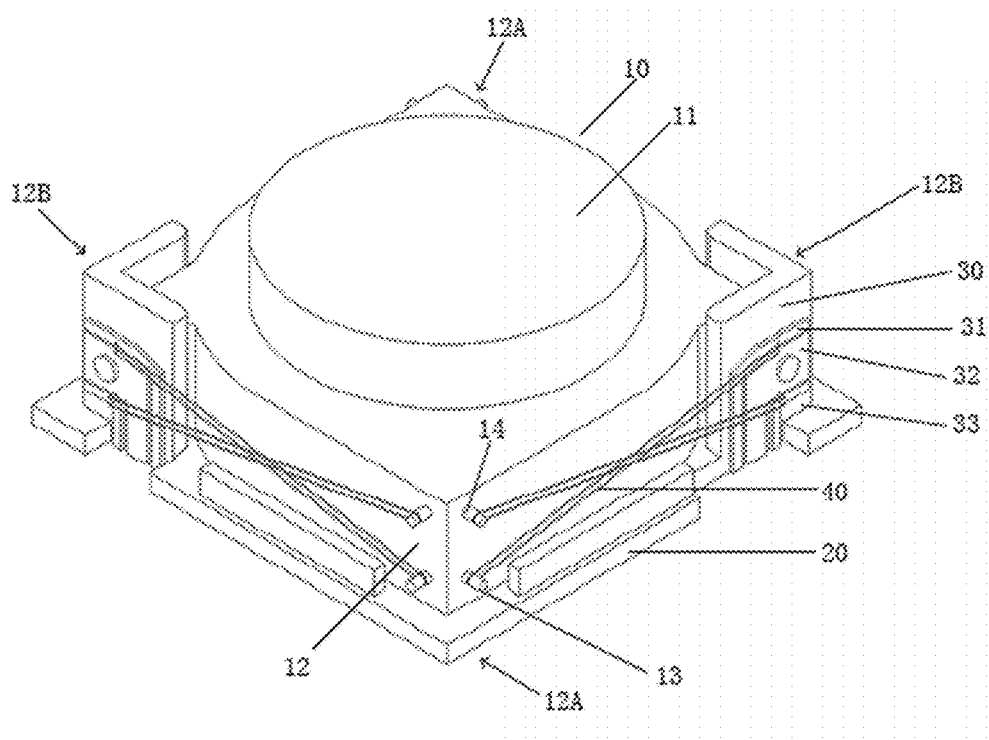
FIG. 1A shows a perspective view of an optical assembly according to one exemplary implementation of the present application when an SMA line is provided.

In order to better understand the present application, various aspects of the present application will be described in more detail with reference to the accompanying drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the accompanying drawings, for convenience of explanation, the thickness, size, and shape of the object have been slightly exaggerated. The accompanying drawings are only examples and are not drawn to scale strictly.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after the list of listed features, it modifies the entire listed feature, rather than the individual elements in the list. In addition, when describing an implementation of the present application, "may/can" is used to denote "one or more implementations of the present application". Also, the term "exemplary" is intended to refer to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It should be noted that, in the case of no conflict, the embodiments in the present application and the features in the embodiments can be combined with each other. The present application will be described in detail below in conjunction with embodiments with reference to the accompanying drawings.

FIG. 1A shows a perspective view of an optical assembly according to one exemplary implementation of the present application when an SMA line is provided.

As shown in FIG. 1A, an optical assembly according to one exemplary implementation of the present application includes a lens module 10, a base 20 and a fixing means 30. Before the optical assembly is assembled to a smart device, a SMA line 40 also needs to be mounted on the optical assembly.

The lens module 10 includes a lens 11 and a rectangular outer frame 12 surrounding the lens 11. The rectangular outer frame 12 has four side surfaces. In the perspective view shown in FIG. 1A, the structural arrangement of two side surfaces of the outer frame 12 can be seen. It should be understood that there are also similar structural arrangements on the other two side surfaces of the outer frame 12 not shown in FIG. 1A.

On each side surface of the outer frame 12, it respectively includes two winding portions, i.e. a first winding portion 13 and a second winding portion 14, and the first winding portion 13 and the second winding portion 14 on each side surface are both located at a group of diagonal regions 12A of the outer frame 12. The first winding portion 13 and the second winding portion 14 may be integrally formed on the outer frame 12 of the lens module 10.

The base 20 is disposed below the lens module 10 and is used to support the lens module 10. The lens module 10 is disposed substantially centrally on the base 20. When driven, the lens module 10 may move along an optical axis of the lens 11, and move in a plane perpendicular to the optical axis, under the support of the base 20. Hereinafter, the driving of the optical assembly of the present application and the movement under the driving will be described in detail in conjunction with its structure.

The fixing means 30 is disposed at another group of diagonal regions 12B of the outer frame 12 of the lens module 10. The fixing means 30 is fixed on the base 20. As shown in the figure, the fixing means 30 has fixing surfaces separately corresponding to each side surface of the outer frame 12. That is, the fixing means 30 has four fixing surfaces corresponding to the four side surfaces of the outer frame 12, respectively. There are two fixing surfaces at each diagonal region 12B. Although the figure shows that the two fixing surfaces located at each diagonal region 12B are formed into an L-shape as a whole, optionally, the two fixing surfaces located at each diagonal region 12B may also be completely or partially separated.

On the fixing surfaces separately corresponding to each side surface of the outer frame 12, the fixing means 30 includes a first power supply fixing end 31, a groundwire fixing end 32 and a second power supply fixing end 33. A first power supply fixing portion 311 corresponding to the first winding portion 13 is disposed on the first power supply fixing end 31, and a second power supply fixing portion 331 corresponding to the second winding portion 14 is disposed on the second power supply fixing end 33. The first groundwire fixing portion 321 corresponding to the first winding portion 13 and the second groundwire fixing portion 322 corresponding to the second winding portion 14 are both disposed on the groundwire fixing end 32. The fixing means 30 including the first power supply fixing end 31, the groundwire fixing end 32, and the second power supply fixing end 33 is fixed to the base 20, and each of the first power supply fixing end 31, the groundwire fixing end 32, and the second power supply fixing end 33 has an electrical connection with the base 20. The first power supply fixing end 31, the groundwire fixing end 32, and the second power supply fixing end 33 are separated from each other, thereby forming electrical isolation from each other, and the first power supply fixing end 31 and the second power supply fixing end 33 are separately powered. The power supply fixing portion and the groundwire fixing portion described above may be fixing points on the power supply fixing end and the groundwire fixing end or fixing elements at the fixing points.

It should be understood that although it is shown in FIG. 1A that the first groundwire fixing portion 321 corresponding to the first winding portion 13 and the second groundwire fixing portion 322 corresponding to the second winding portion 14 are both disposed on the same groundwire fixing end 32, the two may also be separately disposed on different groundwire fixing ends.

Figure 2:
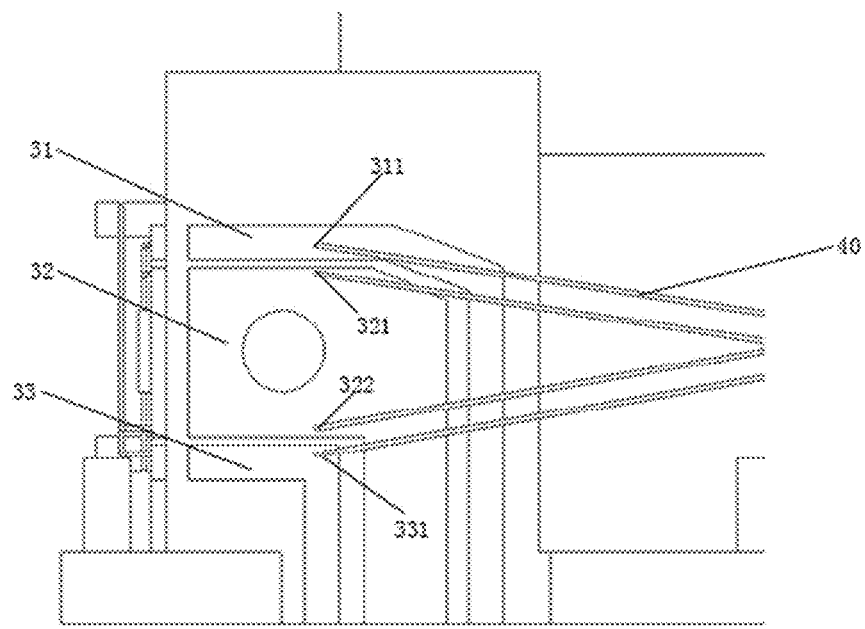
FIG. 2 is a partially enlarged view of a fixing means in the implementation shown in FIG. 1A.

FIG. 2 is a partially enlarged view of the fixing means 30 in the implementation shown in FIG. 1A, and this partially enlarged view corresponds to one fixing surface of the fixing means 30. It can be seen from FIG. 2 that the groundwire fixing end 32 is located between the first power supply fixing end 31 and the second power supply fixing end 33, so that the first groundwire fixing portion 321 corresponding to the first winding portion 13 and the second groundwire fixing portion 322 corresponding to the second winding portion 14 may be disposed on the same groundwire fixing end 32 in a shared manner. The first power supply fixing end 31, the groundwire fixing end 32 and the second power supply fixing end 33 are separated from each other by a certain distance so as to ensure electrical isolation between each other. As described above, the fixing means 30 may also include two groundwire fixing ends, on which the first groundwire fixing portion 321 corresponding to the first winding portion 13 and the second groundwire fixing portion 322 corresponding to the second winding portion 14 are disposed. It should be understood that the power supply fixing end and the groundwire fixing end may also be disposed and provided in other ways than those shown in the figure.

FIGS. 1A and 2 also show SMA lines 40 disposed outside the lens module 10 and the fixing means 30. In the illustrated implementation, each SMA line 40 has two fixed ends and one movable end. The two fixed ends (located at both end portions) of each SMA line 40 are fixed to a set of power supply fixing portion and groundwire fixing portion, respectively, and one movable end (located at the middle portion) is wound around a winding portion corresponding to the set of power supply fixing portion and groundwire fixing portion.

The first winding portion 13, the first power supply fixing portion 311 and the first groundwire fixing portion 321 are disposed so that: two line segments, formed after the SMA line 40 with the two ends fixed to the first power supply fixing portion 311 and the first groundwire fixing portion 321, respectively, and the movable end wound on the first winding portion 13 is wound, are substantially parallel. There are positions that are in contact with the two substantially parallel SMA line segments, respectively, on the first winding portion 13, and they are referred to as a first winding position and a second winding position, respectively. That is, a first connecting line between a first winding position on the first winding portion 13 and a fixing position on the first power supply fixing portion 311, and a second connecting line between a second winding position on the first winding portion 13 and a fixing position on the first groundwire fixing portion 321, are parallel to each other. The second winding portion 14, the second power supply fixing portion 331 and the second groundwire fixing portion 322 are disposed so that: two line segments, formed after the SMA line 40 with the two ends fixed to the second power supply fixing portion 331 and the second groundwire fixing portion 322, respectively, and the movable end wound on the second winding portion 14 is wound, are substantially parallel. That is, a third connecting line between a third winding position on the second winding portion 14 and a fixing position on the second power supply fixing portion 331, and a second connecting line between a fourth winding position on the second winding portion 14 and a fixing position on the second groundwire fixing portion 331, are parallel to each other. The winding portions and the fixing portions described above are further disposed so that the first and second connecting lines parallel to each other, and the third and fourth connecting lines parallel to each other, intersect but do not contact each other. Thus, two SMA lines fixed and wound on the two groups of winding portions and fixing portions are formed to intersect but not contact each other.

For example, on each side surface of the outer frame 12, the distances between the first winding position and the second winding position of the first winding portion 13 on one hand and the corresponding side surface of the outer frame 12 on the other hand are the same or approximately the same. The distances between the third winding position and the fourth winding position of the second winding portion 14 on one hand and the corresponding side surface of the outer frame 12 on the other hand are also the same or approximately the same. The distances between the first winding position and the second winding position of the first winding portion 13 on one hand and the corresponding side surface of the outer frame 12 on the other hand are different from those between the third winding position and the fourth winding position of the second winding portion 14 on one hand and the corresponding side surface of the outer frame 12 on the other hand.

For another example, on each fixing surface of the fixing means 30, the distances between the fixing position on the first power supply fixing portion 311 and the fixing position on the first groundwire fixing portion 321 on one hand and the fixing surface on the other hand are the same or approximately the same. The distances between the fixing position on the second power supply fixing portion 331 and the fixing position on the second groundwire fixing portion 322 on one hand and the fixing surface on the other hand are the same or approximately the same. The distances between the fixing position on the first power supply fixing portion 311 and the fixing position on the first groundwire fixing portion 321 on one hand and the fixing surface on the other hand are different from those between the fixing position on the second power supply fixing portion 331 and the fixing position on the second groundwire fixing portion 322 on one hand and the fixing surface on the other hand.

By setting the winding positions and/or the fixing positions at different distances from the respective side surface or the respective fixing surface, the two SMA lines fixed and wound on the two groups of winding portions and the fixing portions are formed to intersect but do not contact each other. In the case where the two SMA lines fixed and wound on the two groups of winding portions and the fixing portions are formed to intersect but do not contact each other, the lens 11 may move along the optical axis and move in a plane perpendicular to the optical axis when different SMA lines are powered and driven.

In the implementation shown in FIG. 1A, the first winding portion 13 and the second winding portion 14 are disposed perpendicular to the optical axis of the lens 11 and have winding structures parallel to the optical axis. Optionally, the winding portion itself may not be perpendicular to the optical axis, but a plane formed by the first connecting line and the second connecting line after winding is parallel to the optical axis, that is, the centers of the first winding structure 131 and the second winding structure 141 described later are perpendicular to the optical axis.

It should be understood that although the outer frame 12 shown in the figures is rectangular, the outer frame may be any suitable shape other than the rectangle, as long as the position and structure of the winding portion and the fixing portion are disposed so that the SMA lines can be formed into a quadrilateral (preferably rectangular) winding, the four sides of the quadrilateral correspond to the side surfaces of the outer frame in four directions, respectively, and thus the lens module can be driven to move in a manner described below. For example, the outer frame may also be arc-shaped, a winder is disposed on the arc-shaped outer surface, and the winder can form a quadrilateral, preferably a rectangle, with the power supply fixing end and the groundwire fixing end disposed in the fixing means. For another example, the fixing means may be circular arc-shaped. The power supply fixing end and the groundwire fixing end are disposed on the outer surface of the circular arc. The shapes and sizes of the power supply fixing end and the groundwire fixing end are changed accordingly, so that they can form a quadrilateral resembling a rectangle together with the winder.

In fact, the outer frame of the lens module may have four side surfaces divided according to an angle range, as long as the winding portion on each side surface and the corresponding fixing portion may be disposed to be capable of forming the above quadrilateral. It should be understood that the four side surfaces divided according to an angle range respresent four quadrants, which quadrants are divided with respect to a center position of the outer frame as a center point (a circle center), and the angle range of each quadrant corresponds to one side surface. For example, for a rectangular outer frame, the four side surfaces thus divided correspond to four sides of the rectangle; and for a circular outer frame, the four side surfaces thus divided correspond to four quarter circular arcs. That is to say, the outer frame of the lens module may have any shape as long as the winding portion disposed on each side surface divided according to the angle and the corresponding fixing portion on the fixing means cooperate to form a desired quadrilateral structure.

It should also be understood that the base in the above implementation is not necessary for the optical assembly of the present application. For example, a support portion may laterally extend from the bottom of the fixing means to replace the base.

Figure 3A:
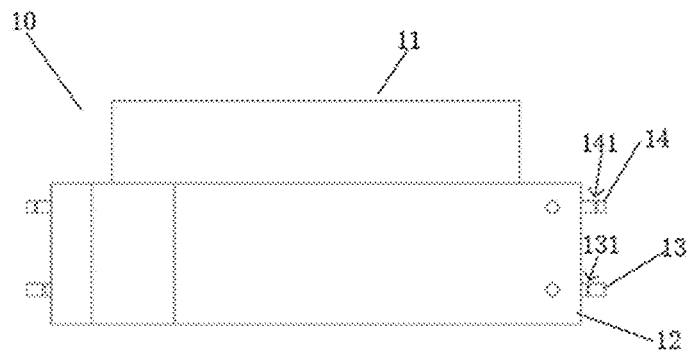
FIG. 3A shows a schematic view of a winding portion in the implementation shown in FIG. 1A.

FIG. 3A shows a schematic view of a winding portion in the implementation shown in FIG. 1A. As shown in FIG. 3A, the first winding portion 13 and the second winding portion 14 extend vertically from the side surface of the outer frame 12, and thus are perpendicular to the optical axis of the lens 11. A first winding structure 131 and a second winding structure 141 parallel to the optical axis are disposed on the first winding portion 13 and the second winding portion 14, respectively. For example, the first winding structure 131 and the second winding structure 141 are groove structures disposed on the first winding portion 13 and the second winding portion 14, respectively, for winding SMA lines. As shown in the figure, the first winding structure 131 and the second winding structure 141 are disposed at different distances from the side surface of the outer frame 12, respectively. Thus, when the fixing portions on the fixing means 30 are disposed at the same distance from the fixing surface, the two SMA lines 40 fixed and wound as described above intersect but do not contact. The first winding portion 13 and the second winding portion 14 shown in FIG. 3A have substantially the same length, whereas the first winding structure 131 and the second winding structure 141 are formed at different positions away from heads or distal ends of the first winding portion 13 and the second winding portion 14, respectively. It should be understood that the structures of the winding portions are not limited to this. For example, the first winding portion 13 and the second winding portion 14 having different lengths may be used, and the first winding structure 131 and the second winding structure 141 are formed at the same position away from the heads or distal ends of the first winding portion and the second winding portion, as long as the first winding structure and the second winding structure are formed at different distances from the side surface of the outer frame 12, respectively. In a different implementation, the first winding structure 131 and the second winding structure 141 may also be formed at the same distance from the side surface of the outer frame 12, whereas the corresponding fixing portion on the fixing means is formed at different distances from the corresponding fixing surface.

Figure 1B:
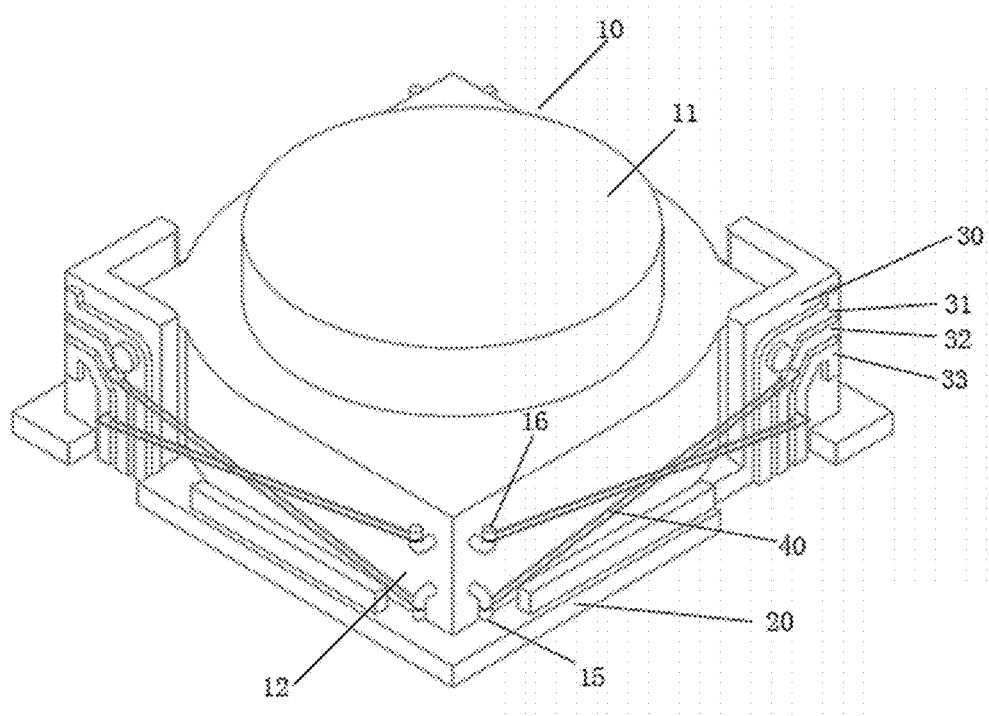
FIG. 1B shows a perspective view of an optical assembly according to another exemplary implementation of the present application when an SMA line is provided.

FIG. 1B shows a perspective view of an optical assembly according to another exemplary implementation of the present application when an SMA line is provided. Compared with the implementation shown in FIG. 1A, the main difference of the implementation shown in FIG. 1B lies in the structure of the winding portion. The first winding portion 15 and the second winding portion 16 in FIG. 1B have a similar L-shaped structure, and a main body having winding structures is disposed parallel to the optical axis of the lens 11 and has winding structures 151 and 161 perpendicular to the optical axis.

In the above implementation, in order to facilitate the installation of the SMA line, the heights of the power supply fixing end and the corresponding groundwire fixing end may be set to be different from each other. That is, the distances between the fixing position on the first power supply fixing portion and the fixing position on the first groundwire fixing portion on one hand and the corresponding side surface of the outer frame on the other hand are different, and the distances between the fixing position on the second power supply fixing portion and the fixing position on the second groundwire fixing portion on one hand and the corresponding side surface of the outer frame on the other hand are different. At this time, the overall heights of the power supply fixing end and the groundwire fixing end may be different, or the fixing positions on the power supply fixing end and the groundwire fixing end may be set at different heights.

It should be understood that the shape and structure of the winding portion itself may not be perpendicular or parallel to the optical axis, as long as the winding structure thereon is parallel or perpendicular to the optical axis as described in the above implementation. Further, according to actual needs, the winding structure can also be set at an included angle with the optical axis, and the existence of the included angle makes the SMA have higher consistency when shrinking.

Figure 3B:
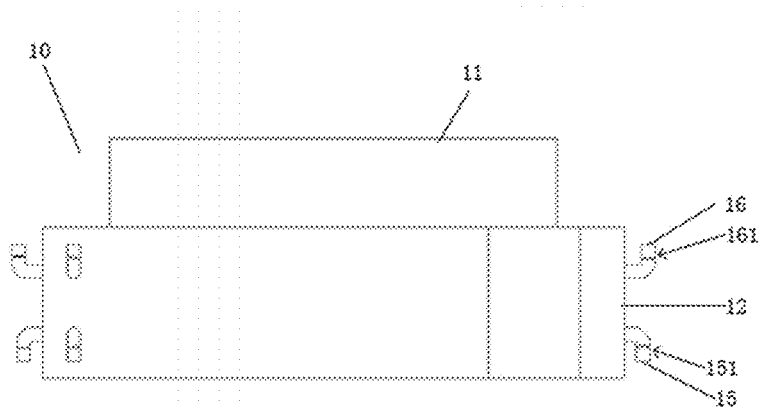
FIG. 3B shows a schematic view of a winding portion in the implementation shown in FIG. 1B.

FIG. 3B shows a schematic view of a winding portion in the implementation shown in FIG. 1B. As shown in FIG. 3B, the main bodies of the first winding portion 15 and the second winding portion 16 are parallel to the optical axis of the lens 11, and the first winding portion 15 and the second winding portion 16 have connection structures extending from their main bodies to the side surface of the outer frame 12. Optionally, the first winding portion 15 and the second winding portion 16 that are parallel to the optical axis may be connected to the side surface of the outer frame 12 through additional connecting members. A first winding structure 151 and a second winding structure 161 perpendicular to the optical axis are separately provided on the side surface of the outer frame 12. As shown in the figure, the first winding structure 151 and the second winding structure 161 are disposed at different distances from the side surface of the outer frame 12, respectively. Thus, when the fixing portions on the fixing means 30 are disposed at the same distance from the fixing surface, the two SMA lines 40 fixed and wound as described above intersect but do not contact. In a different implementation, the first winding structure and the second winding structure may also be formed at the same distance from the side surface of the outer frame 12, whereas the corresponding fixing portion on the fixing means is formed at different distances from the corresponding fixing surface.

The winding structures shown in FIGS. 3A and 3B are each I-shaped, i.e. a structure with two wider ends and having a certain recessed distance in the middle relative to the two ends. The recessed portion formed by the recessed distance is used to accommodate the SMA line and limit the undesired movement of the SMA line during driving. Optionally, a T-shaped winding structure may also be used to prevent the SMA line from falling off during driving. Furthermore, a mushroom head-like structure can be added to the winding structure to limit the position of the SMA line and prevent the SMA line from falling off from the winder. This structure may also be similar to screwing a screw into a threaded hole or inserting a positioning pin into a positioning hole. There will be an annular gap between the threaded hole and the screw as final screwing. The annular gap is used to mount the SMA line. Since the head of the screw is relatively large, the limiting effect on the SMA line is enhanced.

Figure 4A:
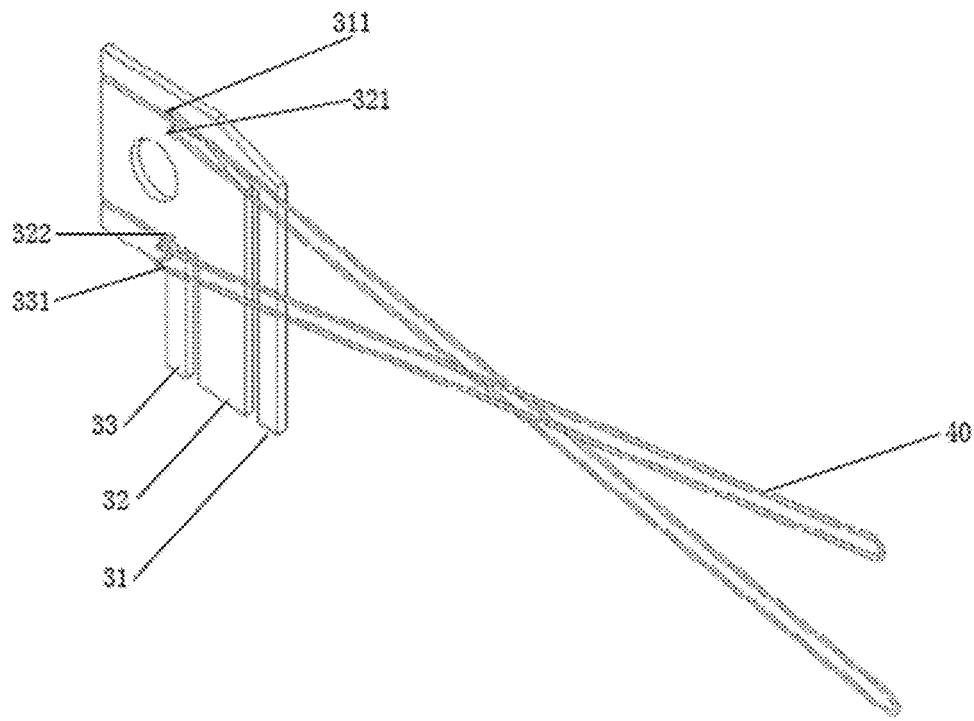
FIG. 4A shows a schematic view of a winding shape according to one exemplary implementation of the present application.
Figure 4B:
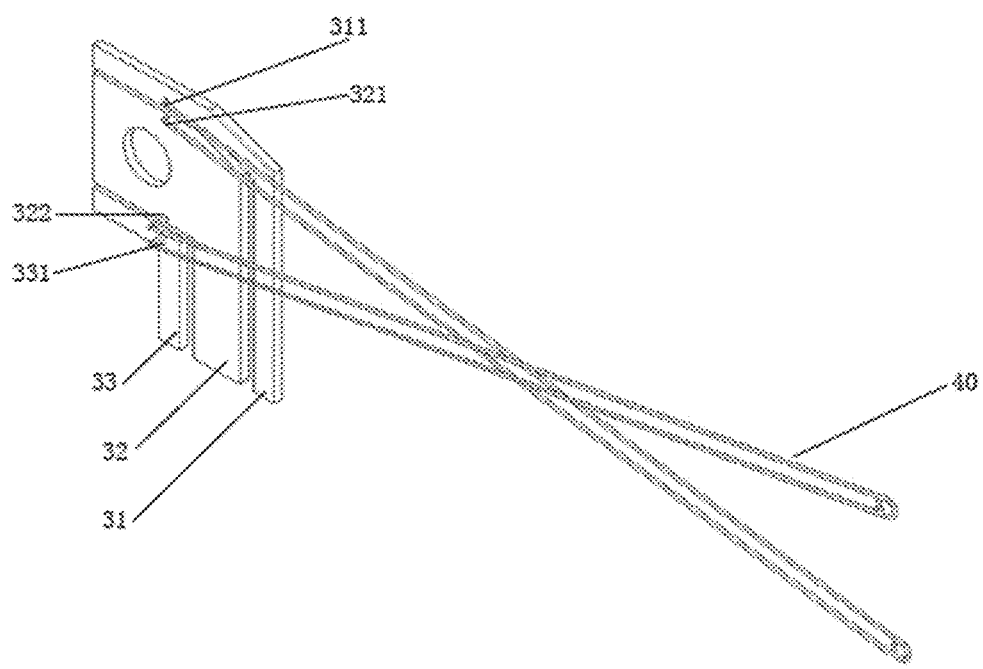
FIG. 4B shows a schematic view of a winding shape according to another exemplary implementation of the present application.

FIGS. 4A and 4B show two winding shapes according to an exemplary implementation of the present application. Specifically, FIG. 4A shows a schematic diagram of the SMA line 40 wound in a U-shaped structure, and FIG. 4B shows a schematic diagram of the SMA line wound in an O/α-shaped structure.

In the illustrated implementation, each SMA line is formed into a U-shaped or O/α-shaped double-layer line structure after winding. Compared with the existing single-line structure, the double-layer line structure has a better structure strength, higher stability, smaller posture difference, higher focusing accuracy and so on. With the double-layer line structure, the structural strength of the SMA line is enhanced, and the SMA line can carry a heavier lens such as a glass lens, or a lens with more lens sheets than the current lens, further improving the quality of the entire module.

Figure 5:
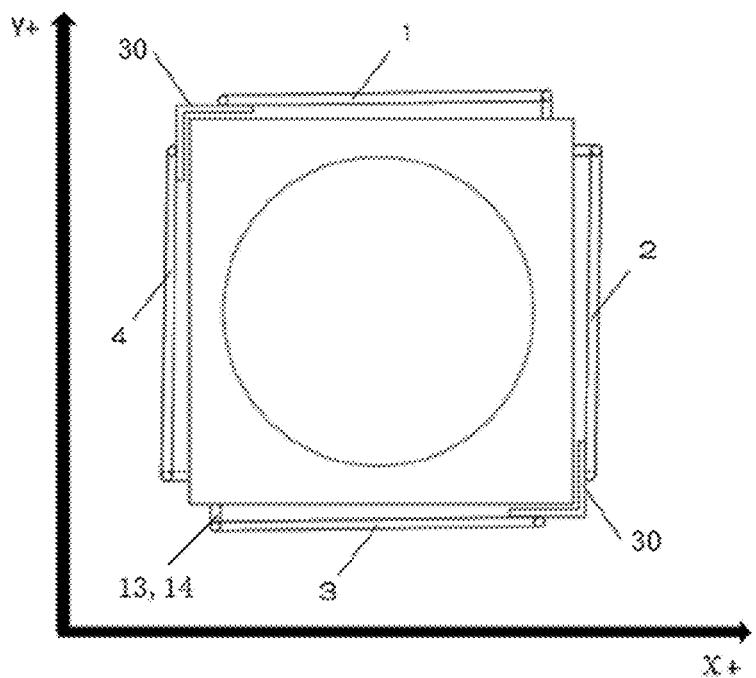
FIG. 5 shows a top view of an optical assembly according to one exemplary implementation of the present application when an SMA line is provided.

FIG. 5 shows a top view of an optical assembly according to one exemplary implementation of the present application when an SMA line is provided. Next, the movement of the optical assembly according to the present application in various directions under the drive of the SMA line will be described with reference to FIG. 5.

As shown in FIG. 5, the optical assembly according to the present application provides a SMA line on each side surface. Although not shown in FIG. 5, it should be understood from the above description that there are two SMA lines intersecting each other but not in contact with each other, instead of only one SMA line, on each side surface. The winding portions 13 and 14 disposed at the diagonal region 12A of the outer frame 12 and the fixing means 30 disposed at the diagonal area 12B are shown in FIG. 5. Although the winding portion shown in FIG. 5 is parallel to the optical axis, it should be understood that the winding portion may be perpendicular to the optical axis. For ease of description, the four side surfaces of the outer frame of the optical assembly are numbered counterclockwise as a first side surface 1, a second side surface 2, a third side surface 3, and a fourth side surface 4, respectively, as shown in FIG. 5. Meanwhile, as shown in FIG. 5, a plane perpendicular to the optical axis is represented by a Cartesian coordinate system, and x and y axes are shown in FIG. 5. Based on the coordinate system shown in FIG. 5, a direction perpendicular to an xy plane may be regarded as a z axis, an upward direction perpendicular to the plane may be a z+ direction, and a downward direction perpendicular to the plane may be a z− direction.

As shown in FIG. 5, four side surfaces are divided into two groups, and two opposite side surfaces form a group. Specifically, the first side surface 1 and the third side surface 3 are a group for controlling the movement of the lens 11 in the x direction. The second side surface 2 and the fourth side surface 4 are a group for controlling the movement of the lens 11 in they direction.

As described above, in the camera module of the present application, the fixing means 30 is fixed to the base 20. Therefore, the fixing means 30 and the fixing portion thereon remain unchanged in position during the movement of the lens 11. When the lens needs to be driven to move in the x+ direction, a current (namely an electrical current) is applied to the two SMA lines on the third side surface, the SMA lines on the third side surface raise a predetermined amount of temperature after being energized, and thus shrink by a predetermined amount of length. Since the two ends of the SMA line are fixed to the fixing means 30, the positions of the two ends of the SMA line remain unchanged. When the lengths of the two SMA lines are shrunk, the movable ends wound around the winding portions jointly apply a force in the x+ direction to the winding portions so as to move the lens 11 by a predetermined distance in the x+ direction. In a case where the SMA lines on the third side surface apply a force in the x+ direction and drive the lens to move in the x+ direction, the SMA lines on the first side surface are stretched as the lens module moves in the x+ direction. After the lens module reaches a desired position and remains a stable state, the SMA lines on the third side surface is cooled, so that the lens module is stably maintained at the desired position and the corresponding focusing or zooming function is realized.

Similarly, when the lens module needs to be driven to move in the x− direction, a current is applied to the SMA lines on the first side surface, so that the SMA lines on the first side surface shrink to drive the lens to move in the x− direction. At this time, the SMA lines on the third side surface are stretched as the lens module moves in the x− direction.

When the lens needs to be driven to move in the y+ direction, a current is applied to the two SMA lines on the fourth side surface, the SMA lines on the fourth side surface raise a predetermined amount of temperature after being energized, and thus shrink by a predetermined amount of length. Since the two ends of the SMA line are fixed to the fixing means 30, the positions of the two ends of the SMA line remain unchanged. When the lengths of the two SMA lines are shrunk, the movable ends wound around the winding portions jointly apply a force in the y+ direction to the winding portions so as to move the lens 11 by a predetermined distance in the y+ direction. In a case where the SMA lines on the fourth side surface apply a force in the y+ direction and drive the lens to move in the y+ direction, the SMA lines on the second side surface are stretched as the lens module moves in the y+ direction. After the lens module reaches a desired position and remains a stable state, the SMA lines on the fourth side surface is cooled, so that the lens module is stably maintained at the desired position and the corresponding focusing or zooming function is realized.

Similarly, when the lens module needs to be driven to move in the y− direction, a current is applied to the SMA lines on the second side surface, so that the SMA lines on the second side surface shrink to drive the lens to move in the y− direction. At this time, the SMA lines on the fourth side surface are stretched as the lens module moves in the y-direction.

It should be understood that although not shown in FIG. 5, an edge of the lens module supported on the base is at an appropriate distance from the fixing means, so that the lens module can be moved by an appropriate distance in the x and y directions under the drive of the SMA line, thereby achieving an optical anti-shake function.

In order to make the axial position of the optical axis remain unchanged when the lens module moves in the x and y directions, the two SMA lines on each side surface can be disposed to be substantially symmetrical with respect to the intersecting position of the two. Therefore, in a case of being applied with approximately the same current, the forces applied to the winding portion are also approximately the same, and thus the axial components of the forces applied by the two are approximately cancelled.

It has been described above that the winding portion and the fixing portion are disposed so that the two SMA lines on each side surface intersect but do not contact. That is to say, one of the two SMA lines on each side surface is disposed corresponding to an upper fixing portion and a lower winding portion, and the other is disposed corresponding to a lower fixing portion and an upper winding portion, thus forming an intersection relationship between the two SMA lines.

When the lens needs to be driven to move in the z+ direction, a current is applied to one of the two SMA lines on each side surface corresponding to the upper fixing portion. That is, a total of four SMA lines with the upper fixing portion are applied with a current, the powered-on SMA lines heat up, and thus shrink by a predetermined amount of length. When the lengths of the four SMA lines are shrunk, the movable ends wound around the winding portions jointly apply a force in the z+ direction to the winding portions so as to move the lens 11 by a predetermined distance in the z+ direction. After the lens module reaches a desired position and remains a stable state, the SMA lines on the fourth side surface is cooled, so that the lens module is stably maintained at the desired position and the corresponding focusing or zooming function is realized.

Similarly, when the lens module needs to be driven to move in the z− direction, a current is applied to one of the two SMA lines on each side surface with the lower fixing portion, so that the energized SMA lines shrink to jointly drive the lens to moves in the z− direction. Thus, the auto-focus function of the lens can be realized.

In order to make the position of the lens module in the x direction and the y direction remain unchanged when it is moved in the z direction, the SMA lines on adjacent side surfaces can be disposed to be substantially symmetrical with respect to a boundary line of the adjacent side surfaces, so that in a case of being applied with approximately the same current, the components of the force applied to the winding portion in the x-direction and y-direction are approximately cancelled.

Figure 6A:
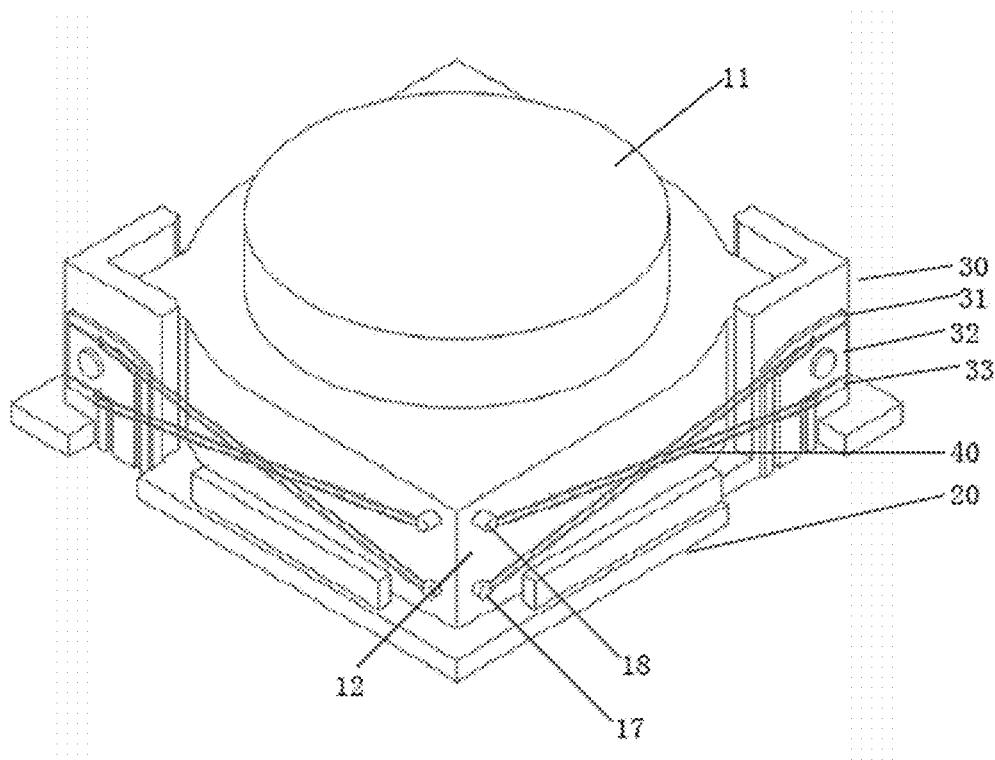
FIG. 6A shows a perspective view of an optical assembly according to yet another exemplary implementation of the present application when an SMA line is provided.

FIG. 6A shows a perspective view of a camera module according to yet another exemplary implementation of the present application when an SMA line is provided. It differs from the implementation shown in FIG. 1A in that a movable end fixing portion is disposed on the outer frame 12 of the lens module 10 instead of the winding portion. As shown in FIG. 6A, on the outer frame of the lens module 10, a first movable end fixing portion 17 and a second movable end fixing portion 18 are provided to clamp and fix the U-shaped structure of the SMA line, and thus it can avoid friction between the SMA line and the winder when the lens moves.

Figure 6B:
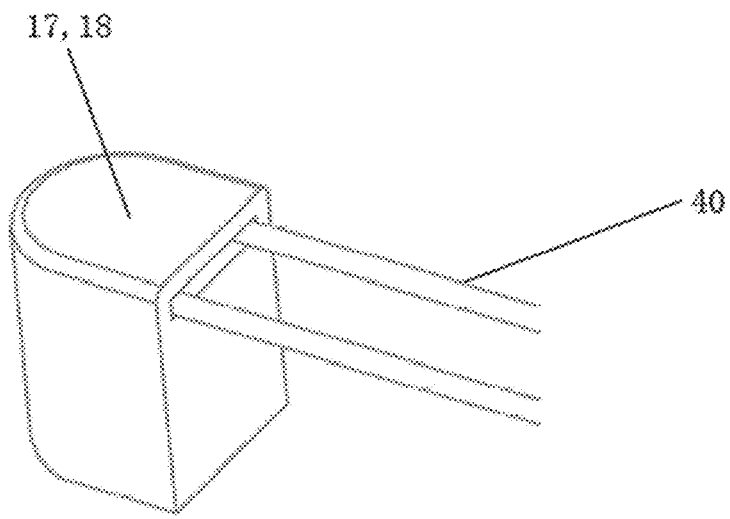
FIG. 6B shows a partially enlarged view of a movable end fixing member in the implementation shown in FIG. 6A.
Figure 6C:
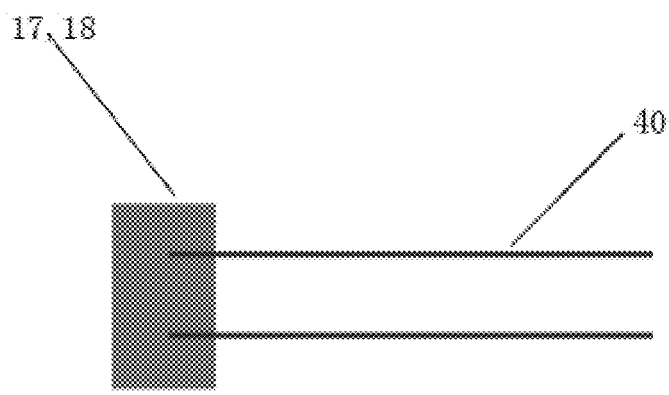
FIG. 6C shows a schematic view of an internal structure of the movable end fixing member in the implementation shown in FIG. 6A.

FIG. 6B shows a partially enlarged view of a movable end fixing member in the implementation shown in FIG. 6A; and FIG. 6C shows a schematic view of the internal structure of the movable end fixing member in the implementation shown in FIG. 6A.

When the movable end fixing portion is used instead of the winding portion, each of two parallel SMA line segments formed equivalent to the U-shaped winding structure is fixed to the movable end fixing portion at at least one point near the winding structure. In this case, the first winding position and the second winding position of the winding portion described above may be a first fixing position and a second fixing position of the movable end fixing portion.

At this time, since the deformation of the SMA line fixed inside by the movable end fixing portion when being energized has no direct or positive effect on the movement of the lens, optionally, the SMA line may be a split structure at the U-shaped structure, that is, a part of the SMA line fixed inside by the movable end fixing portion may be removed. In fact, such a structure is equivalent to dividing one SMA line in the implementations of FIGS. 1A to 4 into two SMA lines to provide. The two SMA lines each have one end connected to the movable end fixing portion, and the other ends of the two SMA lines are connected to the power supply fixing portion and the groundwire fixing portion corresponding to the movable end fixing portion, respectively.

In this case, the two SMA lines are connected between the two ends of the movable end fixing portion, and the electrical connection may be realized by a common conductive element. Since the resistance of the common conductive element is less than the resistance of the SMA line, realizing the electrical connection by the common conductive element can reduce the voltage part taken by the SMA line fixed at the movable end fixing member, reduce the power loss, and improve the power utilization rate.

In the present embodiment, it is equivalent that the first SMA line and the second SMA line each are two lines, and two ends of the first SMA line are fixed to the movable end and the fixed end, respectively, as is the second SMA line.

In one embodiment, two SMA lines may be mounted at the same time, and a slightly larger length is reserved. At the movable end fixing portion, a required line length may be cut and taken according to actual needs. A position inside the movable end fixing portion that is in contact with the SMA line may be a metal structure capable of conducting electricity, so that the line clamped inside the movable end fixing portion can be directly short-circuited, and a current flows directly from the movable end fixing portion. Therefore, the electrical connection between two SMA lines is realized, forming a loop, so that the SMA lines can work normally.

In the solution shown in FIG. 6A for fixing a U-shaped structure by a movable end fixing portion, two SMA lines fixed on the same movable end fixing portion can be separated from each other by only about one line diameter, so that the two SMA line can be better synchronized to move. Optionally, the two SMA lines fixed to the same movable end fixing portion may also be separated from each other by a larger distance so that they do not contact each other and avoid friction between them.

As shown in FIG. 6A, two movable end fixing portions on the same side surface have different sizes, so that the distance between the movable end fixing position on one movable end fixing portion and the side surface is different from that between the movable end fixing position on the other movable end fixing portion and the side surface.

Figure 7:
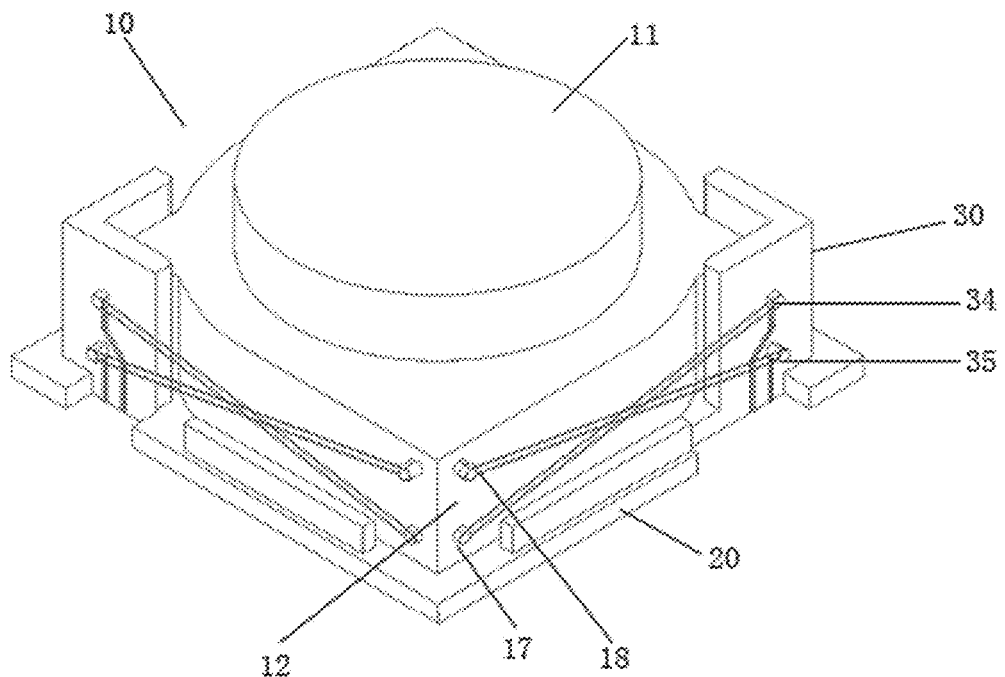
FIG. 7 shows a perspective view of an optical assembly according to still another exemplary implementation of the present application when an SMA line is provided.

FIG. 7 shows a perspective view of a camera module according to still another exemplary implementation of the present application when an SMA line is provided. Similar to the implementation shown in FIG. 6A, in the implementation of FIG. 7, the movable end fixing portion is also used instead of the winding portion. It is different from the implementation of FIG. 6A in that a similar fixing member is further used on the fixing means 30 in the implementation of FIG. 7. As shown in FIG. 7, the fixing means 30 no longer includes a power supply fixing end and a groundwire fixing end that are electrically isolated from each other, but a first fixing member 34 and a second fixing member 35 are disposed on the fixing means. The first power supply fixing portion 311 and the first groundwire fixing portion 321 are fixed in the first fixing member 34 electrically insulated from each other. The second power supply fixing portion 331 and the second groundwire fixing portion 322 are fixed in the second fixing member 35 electrically insulated from each other. That is, two ends of each SMA line whose movable end is fixed to the movable end fixing portion are fixed by the same insulating fixing member, the distance between the two ends of the line fixed by the fixing member may be equal to or greater than the diameter of the line, and the two ends of the SMA line are each led out outwards and are electrically connected to a circuit board, instead of being directly connected to the circuit board through a fixing end. The SMA line may be fixed to the fixing means through glue bonding between the SMA line and the fixing means, or a conductive element may be built in the fixing means so as to realize the electrical connection between the SMA line and the circuit board through the conductive element, or the electrical connection between the SMA line and the circuit board may be realized by other manners.

In the implementation shown in FIG. 7, the two intersected SMA lines have equal or approximately equal lengths so as to avoid friction between the SMA lines when the lens is moved. When the fixing end is directly connected to the circuit board through the SMA line, the downward extending line of the SMA line above the fixing end is not limited to the situation shown in the figure.

Figure 8:
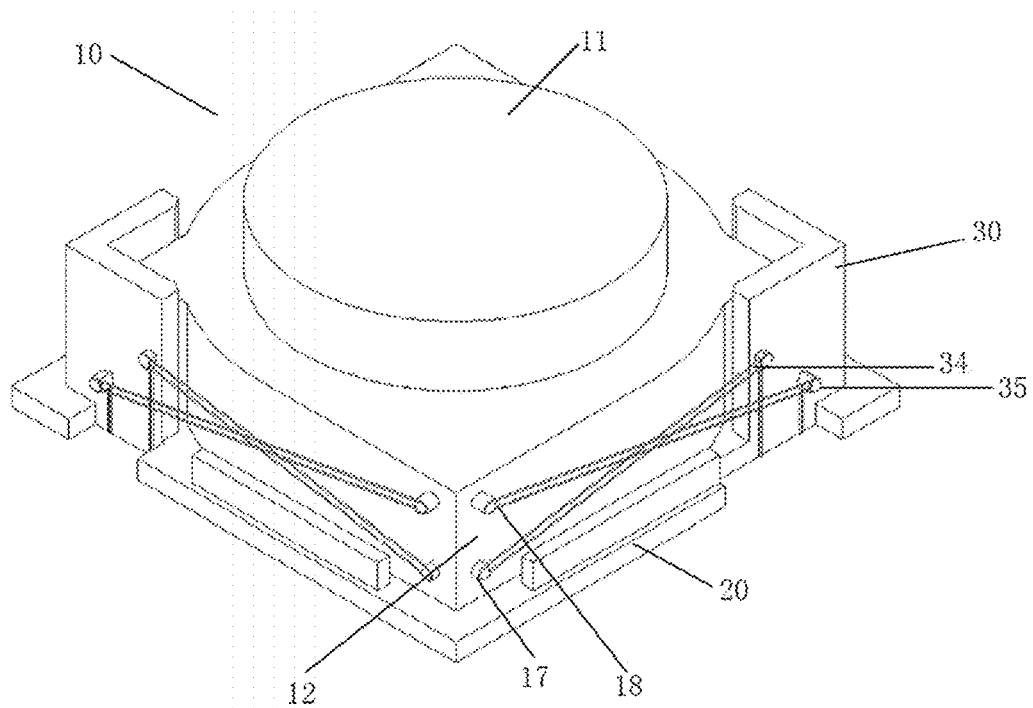
FIG. 8 shows a perspective view of an optical assembly according to further still another exemplary implementation of the present application when an SMA line is provided.

As an option, the two intersected SMA lines may also have different lengths. As shown in FIG. 8, the two intersected SMA lines may also have different lengths. In this case, the SMA line led out through the fixing member on the fixing means can directly extend downward and realize an electrical connection with the circuit board.

In the implementations shown in FIGS. 7 and 8, the SMA line led out through the fixing member on the fixing means is connected to the circuit board. Since the SMA line has the characteristics of heat shrinkage, when mounting the SMA line, a certain length needs to be reserved to prevent the line from breaking. As an option, the SMA line may also end at the fixing member and be electrically connected by conventional conductive wires or insert molding.

Figure 9A:
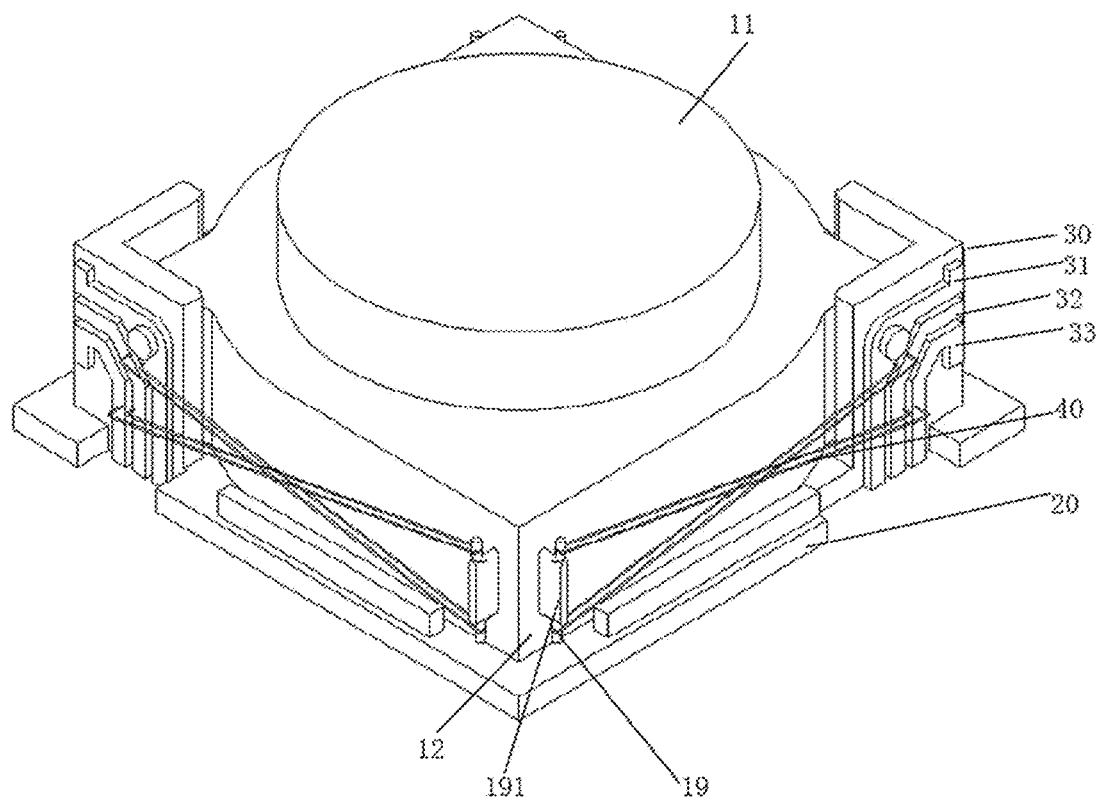
FIG. 9A shows a perspective view of an optical assembly according to even further still another exemplary implementation of the present application when an SMA line is provided.
Figure 9B:
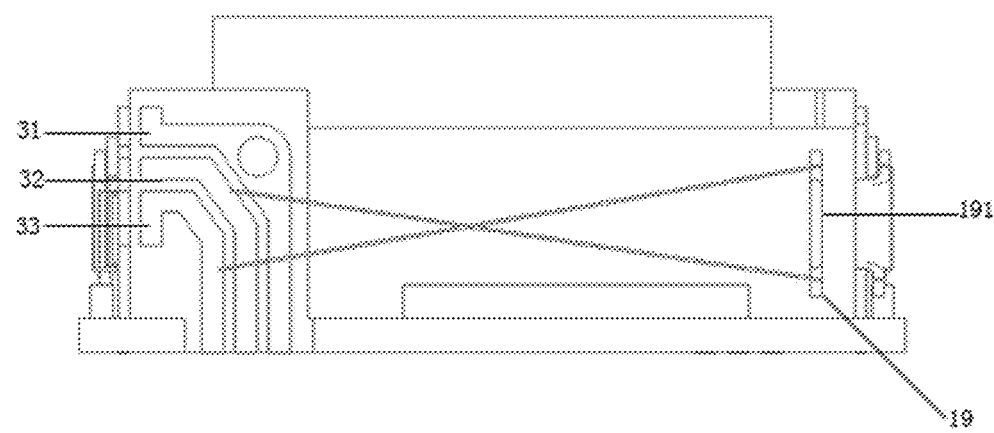
FIG. 9B shows a side view on one side surface according to the implementation shown in 9A.

FIG. 9A shows a perspective view of a camera module according to further still another exemplary implementation of the present application when an SMA line is provided; and FIG. 9B shows a side view on one side surface according to the implementation shown in FIG. 9A.

The implementation shown in FIGS. 9A and 9B differs from the implementation shown in FIG. 1A in that the first winding portion and the second winding portion are formed by two parts on the same shaft member 19 parallel to the optical axis, the shaft member forming the first winding portion and the second winding portion is disposed in a support member 191 extending outward from a corresponding side surface of the outer frame. When the first winding portion and the second winding portion are formed in this way, the shaft member 19 and the support member 191 may be integrally formed with the lens and the outer frame 12 of the camera module by an injection molding process, thereby simplifying the manufacturing process.

It should be understood that the winding portion and the movable end fixing portion in the above implementation may also be implemented as other support members, as long as they can provide support for the movable end of the SMA line and drive the lens module to move with the shrinkage of the SMA line when the SMA line applies a force due to shrinkage.

In the case of using a support portion that has a function of supporting the movable end of the SMA and may be driven by the SMA to drive when the SMA line shrinks, the support position corresponds to the winding position in the implementation described above. Therefore, in some implementations, a first connecting line between the first support position on the first support portion and the fixing position on the first power supply fixing portion and a second connecting line between the second support position on the first support portion and the fixing position on the first groundwire fixing portion are parallel to each other, a third connecting line between the third supporting position on the second support portion and the fixing position on the second power supply fixing portion and the fourth connecting line between the fourth supporting position on the second support portion and the fixing position on the second groundwire fixing portion are parallel to each other, wherein the first connecting line and the second connecting line parallel to each other, and the third connecting line and the fourth connecting line parallel to each other, intersect but do not contact each other. In some implementations, on each side surface of the outer frame, the distances between the first support position and the second support position on one hand and a corresponding side surface of the outer frame one the other hand are different from those between the third support position and the fourth support position on one hand and a corresponding side surface of the outer frame on the other hand.

Figure 10:
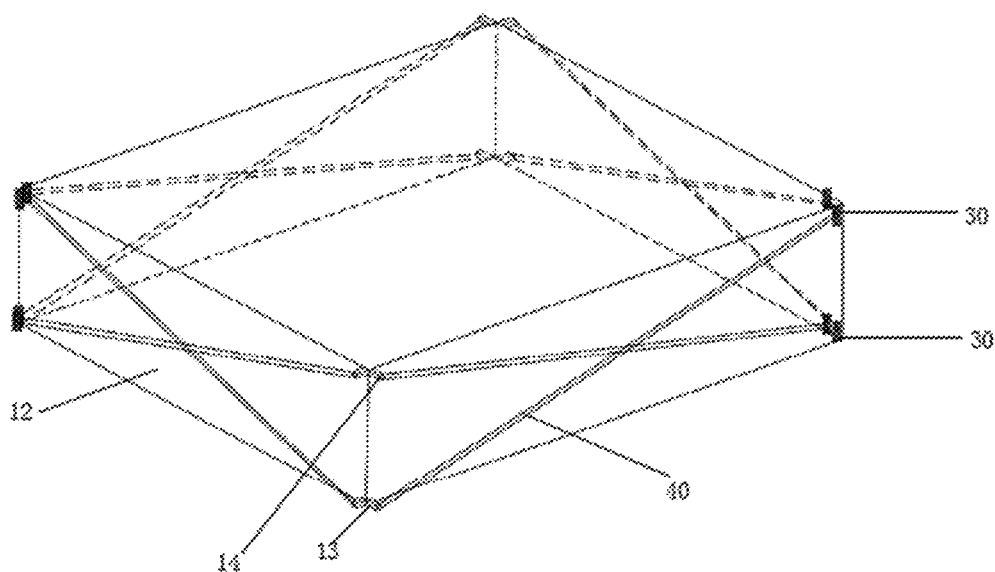
FIG. 10 schematically shows a perspective view of an optical assembly according to an implementation of the present application when a SMA line is wound.

FIG. 10 schematically shows a perspective view of an optical assembly according to an implementation of the present application when a SMA line is wound. Specifically, FIG. 10 shows that two SMA lines 40 are provided on each of four side surfaces of the outer frame 12. The fixed end of each SMA line is fixed on the fixing means 30, and the movable end is supported on support portions 13 and 14.

According to the structure described above and shown in the figures, the present application further provides an implementation of a camera module with an SMA line.

According to one implementation, the camera module may include: a lens module having an outer frame, a base disposed below the lens module and used to support the lens module, and an SMA line disposed around the outer frame of the lens module in a quadrangular shape, wherein four sides of the quadrangular correspond to side surfaces of the outer frame in four directions, respectively, and on each side surface of the outer frame, the SMA line includes a first SMA line and a second SMA line, and wherein the first SMA line and the second SMA line are disposed to intersect each other but not contact. In this implementation, the structure and position of the fixing means and the support portion (including the winding portion and the movable end fixing portion) in the above implementation may not be specifically limited, as long as the SMA disposed on the side surfaces of the outer frame of the lens module is disposed around the outer frame of the lens module in a quadrangular shape, and the two SMA lines on each side of the quadrilateral can intersect each other but do not contact, so that the lens can be driven to move in a desired direction under different driving, which can achieve the purpose of the present application.

In one implementation, the above quadrilateral is configured as a rectangle.

In one implementation, on each side surface of the outer frame, the first SMA line and the second SMA line each have a fixed end and a movable end, the fixed end is disposed at a position corresponding to one end of each side surface of the outer frame, and the movable end is supported at the other end of each side surface of the outer frame. The fixed end is fixed relative to the base, and the movable end is fixed relative to the outer frame. When the SMA line is deformed, the movable end drives the lens module to move relative to the base. The specific situations in which the SMA lines on the side surface of the outer frame of the lens module shrink and move under different driving modes to achieve optical image stabilization and auto-focus have been described in detail above, so the description will not be repeated here. All technical features in the various implementations described above with reference to the drawings are each applicable to the implementation of a camera module with an SMA line without conflict.

For example, in one implementation, at least one of the first SMA line and the second SMA line is folded so as to have two fixed ends and one movable end, and the two fixed ends of at least one of the first SMA line and the second SMA line are disposed at fixed and adjacent positions relative to the base. Thus, the folded SMA lines at both ends are formed to be substantially parallel to each other.

In one implementation, the movable end of at least one of the first SMA line and the second SMA line is supported on the outer frame of the lens module. As described above, the movable end may be supported on the outer frame of the lens module by means of winding or fixing, and the manner of supporting the movable end on the outer frame is not limited to winding and fixing.

In one implementation, at least one of the first SMA line and the second SMA line is folded into two SMA line segments, and the two SMA line segments are parallel to each other and have the same length. In different implementations, the two SMA line segments may also have different lengths.

In one implementation, the SMA lines on the adjacent side surfaces of the outer frame are symmetrically disposed, so that when approximately the same current is applied to achieve optical image stabilization, the components of the force applied by the two to the support position or support portion on the outer frame in the x and y directions are approximately cancelled. In one implementation, on each side surface of the outer frame, the first SMA line and the second SMA line are disposed to be symmetrical to each other and have the same length, so that when approximately the same current is applied during focusing, the force applied to the support position or support portion on the outer frame is also approximately the same. Thus, the axial components of the force applied by the two are approximately cancelled. In one implementation, on each side surface of the outer frame, the first SMA line and the second SMA line are disposed to have at least a part symmetrical to each other.

In one implementation, on each side surface of the outer frame, the movable ends of the first SMA line and the second SMA line are at different distances from each side surface. In one implementation, on each side surface of the outer frame, the fixed ends of the first SMA line and the second SMA line are at different distances from each side surface. Thus, it is ensured that the two SMA lines on each side surface will not rub against each other during the movement due to shrinkage, which, otherwise, will adversely affect the position of the lens module.

In one implementation, the lens module has a first support portion and a second support portion on each side surface of the outer frame, and the first support portion and the second support portion support the first SMA line and the second SMA line, respectively.

In one implementation, at least the first support portion among the first support portion and the second support portion is a winding portion, and the first SMA line is wound on the winding portion.

In one implementation, the winding portion is disposed perpendicular to the optical axis of the lens module, and has a winding structure parallel to the optical axis, so that the first SMA line is wound on the winding structure parallel to the optical axis. In one implementation, the winding portion is disposed parallel to the optical axis of the lens module, and has a winding structure perpendicular to the optical axis, so that the first SMA line is wound on the winding structure perpendicular to the optical axis. In one implementation, the winding portion has a T-shaped or I-shaped winding structure, and the first SMA line is wound on the T-shaped or I-shaped winding structure of the winding portion.

In one implementation, at least the first support portion among the first support portion and the second support portion is a movable end fixing portion, and the first SMA line is fixed on the movable end fixing portion. In one implementation, the first SMA line includes two separate SMA line segments, and the interior of the movable end fixing portion further includes a conductive element disposed between the two separate SMA line segments. Since the resistivity of a common conductive element is greater than that of SMA, the SMA line can parttake of more voltage and improve the power utilization rate. In different implementations, the first SMA line may also include the entire SMA line instead of two separate SMA line segments; and in this case, no additional conductive element is needed in the movable end fixing portion.

It should be understood that the technical features described in any one of the above implementations can be completely or partially used in other implementations without conflict. For example, in the implementation shown in FIG. 1A, one winding portion may be replaced with a movable end fixing portion, and the other winding portion remains to use the winding portion shown in FIG. 1A or a winding portion of another structure.

The above description is only the preferred implementation of the present application and the explanation of the applied technical principles. It should be understood by those skilled in the art that the scope of protection involved in the present application is not limited to technical solutions formed by specific combinations of the above technical features, and at the same time, should also cover other technical solutions formed by any combination of the above technical features or equivalent features thereof without departing from the concept of the present application. For example, the above features and (but not limited to) the technical features with similar functions disclosed in the present application are replaced with each other to form technical solutions.

The invention claimed is:

1. An optical assembly, comprising:
a lens module having an outer frame, wherein the outer frame comprises four side surfaces divided according to an angle range, the lens module comprises a first support portion and a second support portion on each side surface of the outer frame, and both the first support portion and the second support portion on each side surface are located at a group of diagonal regions of the outer frame; and
a fixing means disposed at another group of diagonal regions of the outer frame of the lens module, wherein the fixing means has a first power supply fixing portion and a first groundwire fixing portion corresponding to the first support portion, and a second power supply fixing portion and a second groundwire fixing portion corresponding to the second support portion, on a respective fixing surface corresponding to each side surface of the outer frame;
wherein the positions of the first support portion, the second support portion, the first power supply fixing portion, the first groundwire fixing portion, the second power supply fixing portion and the second groundwire fixing portion are disposed so that;
a first group of connecting lines including a first connecting line and a second connecting line are formed between a first support position on the first support portion and a fixing position on the first power supply fixing portion and between a second support position on the first support portion and a fixing position on the first groundwire fixing portion,
a second group of connecting lines including a third connecting line and a fourth connecting line are formed between a third support position on the second support portion and a fixing position on the second power supply fixing portion and between a fourth support position on the second support portion and a fixing position on the second groundwire fixing portion, and
the first group of connecting lines and the second group of connecting lines intersect but do not contact each other.

2. The optical assembly according to claim 1, wherein it further comprises a base disposed below the lens module, for supporting the lens module and fixing the fixing means.

3. The optical assembly according to claim 1, wherein the first support portion and the second support portion are integrally formed on the outer frame of the lens module.

4. The optical assembly according to claim 1, wherein the positions of the first support portion, the second support portion, the first power supply fixing portion, the first groundwire fixing portion, the second power supply fixing portion and the second groundwire fixing portion are disposed so that:
the first connecting line and the second connecting line are parallel to each other, and the third connecting line and the fourth connecting line are parallel to each other.

5. The optical assembly according to claim 1, wherein on each side surface of the outer frame, distances between the first support position and the second support position on one hand and a corresponding side surface of the outer frame on the other hand are different from those between the third support position and the fourth support position on one hand and a corresponding side surface of the outer frame on the other hand.

6. The optical assembly according to claim 1, wherein on each fixing surface of the fixing means, distances between the fixing position on the first power supply fixing portion and the fixing position on the first groundwire fixing portion on one hand and the fixing surface on the other hand are different from those between the fixing position on the second power supply fixing portion and the fixing position on the second groundwire fixing portion on one hand and the fixing surface on the other hand.

7. The optical assembly according to claim 1, wherein at least the first support portion among the first support portion and the second support portion is a winding portion, and a winding structure of the winding portion is disposed at a position corresponding to the first support position and the second support position.

8. The optical assembly according to claim 7, wherein the winding portion has a winding structure parallel to or perpendicular to the optical axis.

9. The optical assembly according to claim 1, wherein at least the first support portion among the first support portion and the second support portion is a movable end fixing portion.

10. The optical assembly according to claim 9, wherein the movable end fixing portion includes a first movable end fixing position and a second movable end fixing position, and the first movable end fixing position and the second movable end fixing position correspond to the first support position and the second support position, respectively.

11. The optical assembly according to claim 10, wherein the movable end fixing portion further comprises a conductive element inside, and the conductive element is disposed between the first movable end fixing position and the second movable end fixing position.

12. The optical assembly according to claim 1, wherein the fixing means comprises:
a first power supply fixing end and a first groundwire fixing end, wherein the first power supply fixing portion and the first groundwire fixing portion are disposed on the first power supply fixing end and the first groundwire fixing end, respectively; and/or a second power supply fixing end and a second groundwire fixing end, wherein the second power supply fixing portion and the second groundwire fixing portion are disposed on the second power supply fixing end and the second groundwire fixing end, respectively.

13. The optical assembly according to claim 1, wherein the fixing means comprises:
   a first fixing member, wherein the first power supply fixing portion and the first groundwire fixing portion are fixed in the first fixing member in a manner of being electrically insulated from each other, and/or
   a second fixing member, wherein the second power supply fixing portion and the second groundwire fixing portion are fixed in the second fixing member in a manner of being electrically insulated from each other.

14. The optical assembly according to claim 1, wherein the first support portion, the second support portion, the first power supply fixing portion, the first groundwire fixing portion, the second power supply fixing portion and the second groundwire fixing portion corresponding to each side surface of the outer frame, and the first support portion, the second support portion, the first power supply fixing portion, the first groundwire fixing portion, the second power supply fixing portion and the second groundwire fixing portion corresponding to an adjacent side surface, are disposed symmetrically.

15. The optical assembly according to claim 1, wherein distances between the first support portion on each side surface of the outer frame on one hand and the first power supply fixing portion and the first groundwire fixing portion on a corresponding fixing surface of the fixing means on the other hand are the same as those between the second support portion on each side surface of the outer frame on one hand and the second power supply fixing portion and the second groundwire fixing portion on a corresponding fixing surface of the fixing means on the other hand.

16. The optical assembly according to claim 1, wherein distances between the first support portion on each side surface of the outer frame on one hand and the first power supply fixing portion and the first groundwire fixing portion on a corresponding fixing surface of the fixing means on the other hand are different from those between the second support portion on each side surface of the outer frame on one hand and the second power supply fixing portion and the second groundwire fixing portion on a corresponding fixing surface of the fixing means on the other hand.

17. A camera module, comprising the optical assembly according to claim 1.

18. The camera module according to claim 17, wherein it further comprises an SMA line disposed around the outer frame of the camera module, for driving the camera module to move in a plurality of directions.

19. A camera module, comprising:
   an optical assembly, comprising:
      a lens module having an outer frame, wherein the outer frame comprises four side surfaces divided according to an angle range, the lens module comprises a first support portion and a second support portion on each side surface of the outer frame, and both the first support portion and the second support portion on each side surface are located at a group of diagonal regions of the outer frame; and
      a fixing means disposed at another group of diagonal regions of the outer frame of the lens module, wherein the fixing means has a first power supply fixing portion and a first groundwire fixing portion corresponding to the first support portion, and a second power supply fixing portion and a second groundwire fixing portion corresponding to the second support portion, on a respective fixing surface corresponding to each side surface of the outer frame;
   wherein the camera module further comprises an SMA line disposed around the outer frame of the camera module, for driving the camera module to move in a plurality of directions;
   wherein on each side surface of the outer frame, the SMA line comprises a first SMA line and a second SMA line, movable ends of the first SMA line and the second SMA line are supported by the first support portion and the second support portion, respectively, two fixed ends of the first SMA line are fixed to the first power supply fixing portion and the first groundwire fixing portion, respectively, and two fixed ends of the second SMA line are fixed to the second power supply fixing portion and the second groundwire fixing portion, respectively.

* * * * *